Sweeney Mathers & Hartley
Glass-Mould.

No. 3181

Reissued Nov. 3, 1868

Witnesses.

Wm. E. Lyons

J. B. Covington

Inventors

D. C. Matteson &

J. P. Williamson

Denly & Co.

Attorneys

United States Patent Office.

MICHAEL SWEENEY, JAMES E. MATHEWS, AND THOMAS HARTLEY, OF WHEELING, WEST VIRGINIA.

*Letters Patent No.* 52,338, *dated January* 30, 1866; *reissue, No.* 3,181, *dated November* 3, 1868.

IMPROVEMENT IN GLASS-MOULDS.

The Schedule referred to in these Letters Patent and making part of the same.

*To all whom it may concern:*

Be it known that we, MICHAEL SWEENEY, JAMES E. MATHEWS, and THOMAS HARTLEY, of Wheeling, in the county of Ohio, and State of West Virginia, invented a new and useful Improvement in Moulds for Glass; and we do hereby declare that the following is a full, clear, and exact description thereof, which will enable others skilled in the art to make and use the same, reference being had to the accompanying drawings, forming part of this specification, in which—

Similar letters of reference indicate like parts.

The object of this invention is, among other things, to produce a better surface for glass-moulds, to secure an equalization and uniformity in the heat of the moulds while glass is being pressed therein, and to obtain greater facility for handling the mould.

The invention consists, among other things, in moulds in which glass is to be pressed, said moulds being made of hot-blast iron, and having their interior surfaces chilled, by being cast around metallic chills instead of around a sand core, as in the ordinary way, by which means we secure a uniform density in the surface of the mould, and produce a surface fully equal, if not superior, to cast-steel, while it does not prevent the proper finishing of the inside of the moulds.

It also consists in the construction of the exterior surface of the mould, which is made of increased thickness in the centre, in order to secure the equalization of heat throughout its mass while the glass is being pressed. This equalization and uniformity in heat, together with the smoothness of surface produced inside of the mould by the use of the iron or steel-chill in casting, prevents the glass from sticking, as it does in moulds now in use.

It consists, further, in attaching the handles to the moulds, by securing their ends in sockets cast in it, pins being passed through the outside of said sockets, and through the enclosed ends of the handles.

This improvement in making the moulds is found to work well in practice, and to remove or obviate the difficulties usually met with in using moulds made in the ordinary way, while a better surface is given to the glass.

In this example of our invention, A represents a mould of proper form for making tumblers.

Its exterior is formed with an enlargement, B, which extends all around its circumference at about the middle of its height, for the purpose of increasing the mass of the mould, and thereby equalizing the heat therein.

At the opposite points on the exterior of the mould we make projections, D D, in which we form, in the process of casting, sockets of suitable shape and size to receive the ends of the handles C C, by means of which the mould is handled.

The projections, as well as the handles, are perforated, to allow the insertion of pins, E E, which serve to attach the handles securely to the moulds.

Figure 1:
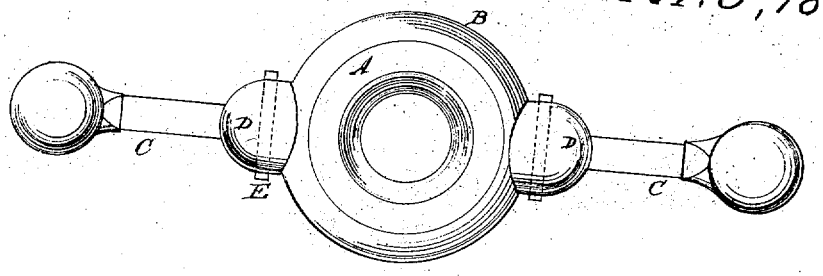
Figure 1 is a plan of a mould made according to our invention.
Figure 2:
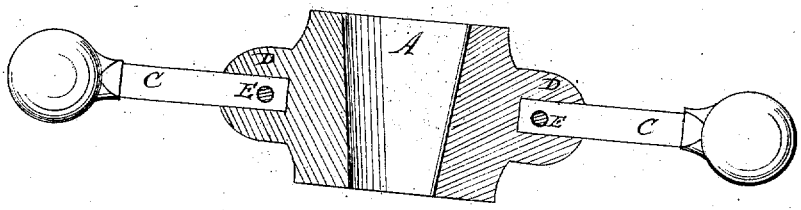
Figure 2 is a vertical section.
Figure 3:
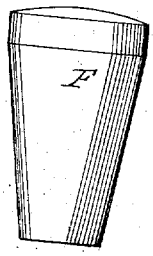
Figure 3 is an elevation of a cover on which the mould is cast.

When a mould is cast around a sand core, its surface is comparatively uneven and porous, so that, when finished in the best possible manner, it yet has not a suitable surface for the work designed. We therefore cast the mould around an iron, steel, or other suitable chill, F, fig. 3, and are thereby enabled to obtain a smooth surface, suitable for moulding glass.

This invention is applicable to all kinds and forms of glass-moulds.

What we claim as new, and desire to secure by Letters Patent, is—

1. Moulds, in which glass is to be pressed, made of hot-blast iron, and cast upon metallic chills, substantially as shown and described.

2. Also, an enlargement, formed around the middle of the mould, in order to obtain the equalization of the heat in the mould while glass is being pressed therein, substantially as set forth.

3. The manner, substantially as above shown, of attaching handles to moulds for glass.

In testimony whereof, we have signed our names to this specification before two subscribing witnesses.

MICHAEL SWEENEY.
JAMES E. MATHEWS.
THOMAS HARTLEY.

Witnesses:
GEO. O. DAVENPORT,
A. J. CLARKE.